United States Patent
Yasui

(10) Patent No.: US 8,124,894 B2
(45) Date of Patent: Feb. 28, 2012

(54) OPERATING DEVICE, INFORMATION PROCESSING TERMINAL INCLUDING THE OPERATING DEVICE, AND ASSEMBLY METHOD FOR THE OPERATING DEVICE AND THE INFORMATION PROCESSING TERMINAL

(75) Inventor: Kenichirou Yasui, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 12/296,855

(22) PCT Filed: Mar. 30, 2007

(86) PCT No.: PCT/JP2007/057279
§ 371 (c)(1),
(2), (4) Date: Oct. 10, 2008

(87) PCT Pub. No.: WO2007/116843
PCT Pub. Date: Oct. 18, 2007

(65) Prior Publication Data
US 2009/0260969 A1    Oct. 22, 2009

(30) Foreign Application Priority Data

Apr. 11, 2006   (JP) .................................. 2006-108299

(51) Int. Cl.
*H01H 9/26* (2006.01)
(52) U.S. Cl. ........................................ 200/5 A; 200/512
(58) Field of Classification Search .................. 200/5 A, 200/512, 517; 361/679.08, 679.2, 748
See application file for complete search history.

(56) References Cited

U.S. PATENT DOCUMENTS

| | | | | |
|---|---|---|---|---|
| 6,057,517 A | * | 5/2000 | Meyer | 200/5 A |
| 6,180,895 B1 | * | 1/2001 | Hutchinson et al. | 200/5 A |
| 2010/0044203 A1 | * | 2/2010 | Matsumoto et al. | 200/5 A |

FOREIGN PATENT DOCUMENTS

| | | |
|---|---|---|
| JP | 1992220918 A | 8/1992 |
| JP | 1994260051 A | 9/1994 |
| JP | 1997261312 A | 10/1997 |
| JP | 2004088653 A | 3/2004 |

OTHER PUBLICATIONS

International Search Report for PCT/JP2007/0527279 mailed May 1, 2007.

* cited by examiner

*Primary Examiner* — Anh Mai
*Assistant Examiner* — Lisa Homza

(57) ABSTRACT

An operating device is provided which includes a stacked structure of a contact terminal sheet including contact terminals, a flexible wiring member including a land folded part and land parts and wire parts, and a plate-like frame supporting the contact terminal sheet and the flexible wiring member. The plate-like frame is folded, forming an operation receiving part for a side surface disposed in a side surface of the device. The contact terminal sheet includes a contact terminal folded part, which is folded along and supported by the operation receiving part, and includes a contact terminal for a side surface, which corresponds to a side surface operation part, and a land folded part, which includes a land part connected to the contact terminal. An extension part, which is folded at a front end part of the operation receiving part, is provided in the contact terminal folded part.

16 Claims, 4 Drawing Sheets

(a)

(b)

(c)

OPERATING DEVICE, INFORMATION PROCESSING TERMINAL INCLUDING THE OPERATING DEVICE, AND ASSEMBLY METHOD FOR THE OPERATING DEVICE AND THE INFORMATION PROCESSING TERMINAL

TECHNICAL FIELD

The present invention relates to an operating device, and specifically relates to an operating device including an operation part on its side surface and an information processing terminal including the operating device.

BACKGROUND ART

As disclosed in Patent document 1, there are an increasing number of information processing terminals such as a mobile phone including a constitution in which an operation part is provided on its side surface in order to improve operability and convenience. As an example of the mounting structure, there is a structure in which a depression type switch is mounted on a substrate to combine a switch mechanism and a key button structure on the side surface, because mounting onto the side surface and positioning in the thickness direction of the terminal are difficult. In other words, there is a method of providing a constitution in which a substantially vertical depression direction of a side key and the depression direction of the switch mechanism on the substrate are exchanged for each other. In another example of the mounting structure, a dome-shaped contact terminal is provided substantially parallel to the side surface, and a reinforcing plate is applied to a sheet, on which the contact terminal is mounted, and a flexible cable stacked on the sheet so that rigidity is obtained, whereby the structure is fixed and held to a frame.
Patent document 1: Japanese Patent Application Laid-Open No. H9-261312

DISCLOSURE OF INVENTION

Problems to be Solved by the Invention

However, in the above conventional art examples, there are following disadvantages. In the former structure in which the depression type switch vertical to the side surface button is mounted on the substrate, a region for mounting the switch mechanism should be secured on the substrate, and, there is also a problem that since the parts used in the structure are expensive, a high cost is required. In addition, in the latter structure in which the contact terminal is provided parallel to the side surface, in order to fix and hold the structure, in which rigidity is given to the contact terminal part, to the frame, it is necessary to newly provide and fix parts including such as a frame and a claw engagement part in the fixation of the structure, whereby there is a problem that restrictions with respect to the mounting space occur, and besides, the shape of the frame becomes complicated. In the case in which reduction of the thickness of the mounting structure is assumed, there arises a problem that it is difficult to constitute the structure with the use of a thin material such as a plate.

Therefore, an exemplary object of the present invention is to provide an operating device, which improves the disadvantages of the conventional art examples, and especially simplifies a mounting structure of a side surface operation part so as to simplify mounting process and reduce manufacturing cost, and also to provide an information processing terminal including the operating device.

Means for Solving the Problem

An operating device and an information processing terminal including the operating device according to an exemplary aspect of the present invention includes: a stacked structure of a contact terminal sheet formed in accordance with a plurality of exposed operation parts and including a plurality of contact terminals for detecting an operation state of each of the operation parts, a flexible cable including a plurality of land parts and wire parts connected to the plurality of connect terminals, and a plate-like frame supporting the contact terminal sheet and the flexible cable, wherein the frame is folded to form an operation receiving part for a side surface which corresponds to a side surface operation part disposed in a side surface of the device or the terminal and receives the pressing operation of the side surface operation part; and a contact terminal folded part, which is folded along the operation receiving part for a side surface, supported by the operation receiving part for a side surface, and includes a contact terminal for a side surface corresponding to the side surface operation part, and a land folded part, which includes the land part connected to the contact terminal for a side surface, are respectively provided in the contact terminal sheet and the flexible cable.

According to the above described invention, a structure for mounting a side surface operation part of a side surface of an operating device and an information processing terminal including the operating device is realized by providing a constitution in which each part of a contact terminal sheet, a flexible cable, and a frame which are stacked to form a normal operation part structure is folded along the side surface. With such a constitution, since the pressing force is received by an operation receiving part for a side surface which is a folded part of the frame when the side surface operation part is pressed, the pressing operation is detected in a contact terminal of the contact terminal sheet positioned between the operation receiving part for a side surface and the side surface operation part, whereby an operation signal is transmitted to a land part of the flexible cable. Therefore, the detection of the operation state of the side surface operation part can be realized by a simple configuration, and, at the same time, the constitution of a normal operation part and the constitution of the side surface operation part can be integrated. Thus, a reduction of thickness of a device or a terminal, an acceleration of a manufacturing speed, and a reduction of a manufacturing cost can be realized.

In addition, the present invention is characterized in that an extension part, which is folded at a front end part of the operation receiving part for a side surface so as to cover the front end part, is provided in a contact terminal folded part. At this time, a land folded part is formed to have a length so as to prevent the land folded part from protruding from the front end part of the operation receiving part for a side surface in such a state that the land folded part is supported by the operation receiving part for a side surface.

As above described, the extension part of the contact terminal folded part is folded at the front end part of the operation receiving part for a side surface, whereby the contact terminal folded part can be easily fixed to the operation receiving part for a side surface, and in addition, the positioning can be easily performed. Especially, the positioning in a thickness direction of a device or a terminal can be easily performed. Further, the land folded part of the flexible cable positioned between the operation receiving part for a side surface and the contact terminal folded part can be easily positioned. Thus, a simplification of manufacturing process, an acceleration of a manufacturing speed, and a device or a terminal with high accuracy can be realized.

In addition, the present invention is characterized in that the land folded part supported by the operation receiving part for a side surface is not fixed and adhered to the operation receiving part for a side surface. The present invention is further characterized in that the contact terminal folded part, which is supported by the operation receiving part for a side surface and stacked on the land folded part, is not fixed and adhered to the land folded part.

Thus, as above described, the land folded part and the contact terminal folded part can be fixed to the operation receiving part for a side surface by the extension part provided in the contact terminal folded part, and, at the same time, since each folded part is not fixed and adhered after the fixation to the operation receiving part for a side surface, fine positioning of the land folded part and the contact terminal folded part can be performed, whereby a device or a terminal with high accuracy can be obtained.

Further, the present invention is characterized in that the extension part provided in the contact terminal folded part is applied to the inside of the operation receiving part for a side surface, whereby the land folded part and the contact terminal folded part can be stably fixed to the operation receiving part for a side surface.

In addition, the present invention is characterized in that a recessed part is formed in the front end part of the operation receiving part for a side surface, and, at the same time, a narrow part fitted in the recessed part is provided at a folding position of the extension part in the front end part of the operation receiving part for a side surface. At this time, the length in the folding direction of the narrow part is set to be substantially equal to the plate thickness of the front end part of the operation receiving part for a side surface.

Therefore, the narrow part formed in the extension part which is positioned at the end of the contact terminal folded part, is folded so as to be fitted in the recessed part formed in the front end of the operation receiving part for a side surface, whereby the positioning in the left and right direction and the thickness direction of a device or a terminal can be easily performed, and, at the same time, a more stable assembly can be realized.

An assembly method for an operating device and an information processing terminal including the operating device according to another exemplary aspect of the present invention includes: a stacking process of stacking a contact terminal sheet formed in accordance with a plurality of exposed operation parts and including a plurality of contact terminals for detecting an operation state of each of the operation part, a flexible cable including a plurality of land parts and wire parts connected to the plurality of contact terminals, and a plate-like frame supporting the contact terminal sheet and the flexible cable; and a folding process of folding a contact terminal folded part, which is provided in the contact terminal sheet and includes a contact terminal for a side surface corresponding to a side surface operation part disposed in a side surface of the device or the terminal, and a land folded part, which is provided in the flexible cable and includes the land part connected to the contact terminal for a side surface, so that the contact terminal folded part and the land folded part are supported by an operation receiving part for a side surface formed by folding the frame which receives a pressing operation to the side surface operation part.

The assembly method is characterized by further including an extension part folding process of, after the folding process, folding an extension part, which is provided on the front end side of the contact terminal folded part, at the front end part of the operation receiving part for a side surface so as to cover the front end part. The assembly method is further characterized in that, in the folding process, the land folded part is not fixed and adhered to the operation receiving part for a side surface. The assembly method is further characterized in that, in the stacking process and the folding process, the contact terminal folded part stacked on the land folded part is not fixed and adhered to the land folded part.

Further, the assembly method is characterized by further including an extension part application process of applying the extension part to the inside of the operation receiving part for a side surface after the extension part folding process. The assembly method is further characterized in that, in the extension part folding process, a narrow part which is formed at the folding position of the extension part in the front end part of the operation receiving part for a side surface is fitted in a recessed part formed in the front end part of the operation receiving part for a side surface.

The assembly method for the operating device with the above constitution and the information processing terminal using the operating device is acted in the same manner as the above operating device and information processing terminal, whereby the above exemplary object of the present invention can be achieved.

Effect of the Invention

The present invention is constituted and functioned as above, since each part of the contact terminal sheet, the flexible cable, and the frame which are stacked to form a normal operation part structure is folded along a side surface to realize the structure for mounting the side surface operation part, whereby the structure for mounting the side surface operation part can be realized by a simple constitution, and, at the same time, the constitution of the normal operation part and the side surface operation part can be integrated. Thus, the present invention has an excellent effect of simplifying the constitution and reducing the thickness of the operating device and the information processing terminal, accelerating the manufacturing speed, and reducing the manufacturing cost can be realized.

BEST MODE FOR CARRYING OUT THE INVENTION

The present invention is characterized in that a structure for mounting a side surface operation part in a side surface of an operation device and an information processing terminal is realized by being so constituted that each part of a contact terminal sheet, a flexible cable, and a frame, which are stacked to form a normal operating part structure, is folded so as to face the side surface. Hereinafter, in the exemplary embodiments, as an example of an information processing terminal on which the side surface operation part is mounted, a mobile phone is described; however, a portable information processing terminal such as a PDA and an audio player may be applied to this exemplary embodiment. Further, an operating device such as a remote controller connected to an information processing apparatus may also be applied to this exemplary embodiment.

FIRST EXEMPLARY EMBODIMENT

A first exemplary embodiment of the present invention is described with reference to FIGS. 1 to 5. FIGS. 1 and 2 are exploded views showing a mounting constitution of an operating device of a mobile phone. FIGS. 3 to 5 are explanatory views for explaining an assembly method of an operation part. In this exemplary embodiment, a constitution on the operating device side of a folding type mobile phone is described as an example.

[CONSTITUTION] An operating device of a mobile phone shown in FIG. 1 includes a front case 1 and a rear cover 15 comprising a housing, a stacked structure of a key top 3, a contact terminal sheet 5, a flexible wiring member 8, a frame 11, and a substrate 14. The detail is described below.

The front case 1 includes key holes, on its top surface, through which a plurality of buttons (operation parts) such as a numeric keypad provided on the key top 3 are exposed. The front case 1 also includes a side key hole 4, on its side surface, through which a side key 4 provided on the key top 3 is exposed. The front case, 1 and the rear cover 15 are fitted with each other, and the frame 11 and the substrate 14, which are described in detail below, are fixed and accommodated in the inside of the housing, whereby the operating device of the mobile phone is configured. Note that, a display device (not shown) is rotatably assembled by a hinge part, which is provided at one end of the front case 1, whereby the mobile phone is configured; however, the explanation of the display device is not described.

The key top 3 is formed of a resin having elasticity. The key top 3 includes the above-mentioned plurality of buttons, on its one surface (front surface), such as the numeric keypad which can be depressed perpendicular to the front surface. In addition, a surface substantially perpendicular to the front surface is provided in an extending manner in a part of the circumference of the key top 3, and the side key 4 (side surface operation part), which can be depressed substantially perpendicular to the extension surface, that is, perpendicular to the buttons such as the numeric keypad, is provided on the extension surface.

Next, the frame 11 is described in detail. The frame 11 is a resin or a plate for stacking, supporting, and fixing the contact terminal sheet 5 and the flexible wiring member 8 to be described later. Specifically, the flexible wiring member 8 and the contact terminal sheet 5 are stacked and applied to the front surface (top surface in FIG. 1) with an adhesive. The four corners of the frame 11 are formed with positioning holes 13. The flexible wiring member 8 and the contact terminal sheet 5 are applied to the frame 11 with the use of an assembly tool (not shown) inserted through positioning holes 10 and 7, which area respectively formed in the flexible wiring member 8 and the contact terminal sheet 5 as with the positioning holes 13.

A part of a side of the frame 11 is provided with an operation receiving part for a side surface 12 which is folded substantially perpendicular to the front surface of the frame 11 and has a substantially rectangular shape. The operation receiving part for a side surface 12 is formed to correspond to the position of the side key 4 in the assembly of the operating device, forms a surface formed substantially perpendicular to the pressing direction of the side key 4, and includes a function as a wall surface receiving the pressing force. The operation receiving part for a side surface 12 supports a contact terminal folded part 6 of the contact terminal sheet 5 and a land folded part 9 of the flexible wiring member 8 to be described later by inserting the contact terminal folded part 6 and the land folded part 9 between the operation receiving part for a side surface 12 and the side key 4.

The operation receiving part for a side surface 12 is formed with a recessed part 19 formed in the end surface of the front end part. The central part of the recessed part 19 is recessed toward the folded part side. The width of the recessed part 19 is represented as reference numeral b, for example, as shown in FIG. 4, and formed to be equal to or slightly wider than the width B of a narrow part 61 of the contact terminal sheet 5 to be described later. The plate thickness of the operation receiving part for a side surface 12 is represented as reference numeral a, for example, as shown in FIG. 4, and formed to be equal to or slightly thinner than the length A of the narrow part 61.

Next, the contact terminal sheet 5 is described in detail. Dome-shaped contact terminals are arranged and provided in the contact terminal sheet 5 so as to correspond to the plurality of buttons and the side key 4 provided on the key top 3 and detect the pressing operation of the buttons and the side key 4. Specifically, a part of the side of the contact terminal sheet 5 is provided with the contact terminal folded part 6 with a substantially rectangular shape to be folded as mentioned below. The contact terminal folded part 6 is provided with a contact terminal for a side surface 6a which corresponds to the above-described side key 4 and is used for detecting the pressing operation of the side key 4. As shown in FIG. 2, the contact terminal folded part 6 is in the state of being opened without folding so as to form the same plane as the body of the contact terminal sheet 5 before the assembly of the operating device, and in the assembly of the operating device, the contact terminal folded part 6 is folded along the operation receiving part for a side surface 12 of the frame 11 to be stacked on the land folded part 9 of the flexible wiring member 8, whereby the contact terminal for a side surface 6a is disposed to face the side key 4. The contact terminal folded part 6 is formed to have substantially the same shape as that of the operation receiving part for a side surface 12.

The main body part of the contact terminal sheet 5 disposed substantially parallel to the frame 11 includes an adhesive on the frame 11 surface side. The contact terminal sheet 5 is stacked and applied to the flexible wiring member 8, which is directly applied to the frame 11, with the adhesive. Meanwhile, the contact terminal folded part 6 does not include an adhesive on the frame 11 surface side, whereby the contact terminal folded part 6 is supported by the operation receiving part for a side surface 12, but not fixed and adhered to the operation receiving part for a side surface 12, that is, the land folded part 9 of the flexible wiring member 8 inserted in between the contact terminal folded part 6 and the operation receiving part for a side surface 12.

Further, as shown in FIGS. 2 and 4, an extension part 60 is formed on the front end side of the contact terminal folded part 6 of the contact terminal sheet 5. The extension part 60 in its root part comprises a narrow part 61 with narrower width than the extension part 60. The extension part 60 positioned on the front end side relative to the narrow part 61 is formed into a substantially rectangular shape with substantially the same width as the contact terminal folded part 6. As shown in FIG. 4, the width B of the narrow part 61 is equal to or slightly narrower than the width b of the recessed part 19 of the operation receiving part for a side surface 12 of the frame 11. Meanwhile, as shown in FIG. 4, the length A of the narrow part 60 in the folded direction is substantially equal to or slightly longer than the plate thickness of the operation receiving part for a side surface 12. Thereby, as mentioned below, when the extension part 60 is folded at the front end part of the operation receiving part for a side surface 12 at the narrow part 61, the narrow part 61 is fitted in the recessed part 19. At this time, especially, the narrow part 61 is folded at 360 degrees to the front end part of the operation receiving part for a side surface 12, whereby the extension part 60 positioned on the front end side is positioned on the rear surface side (inner surface side) of the operation receiving part for a side surface 12. Since the extension part 60 includes an adhesive on the frame 11 surface side, the extension part 60 is fixed and adhered to the rear surface side (inner surface side) of the operation receiving part for a side surface 12. Note that although an adhesive may be provided also in the narrow part 61, an adhesive is not provided in the contact terminal folded part 6.

Then, the flexible wiring member 8 is described in detail. The flexible wiring member 8 is inserted in between the contact terminal sheet 5 and the frame 11 and includes a plurality of land parts and wires corresponding to a plurality of contact terminals provided in the contact terminal sheet 5. A part of the side of the flexible wiring member 8 includes the substantially rectangular land folded part 9 which is inserted in between the operation receiving part for a side surface 12 and the contact terminal folded part 6 and has substantially the same shape as the operation receiving part for a side surface 12 and the contact terminal folded part 6. The land folded part 9 includes a land part for a side surface 9a corresponding to the contact terminal for a side surface 6a. As with the above-described contact terminal folded part 6, the land folded part 9 is in the state of being opened without folding so as to form the same plane as the body of the contact terminal sheet 5 before the assembly of the operating device, while in the assembly of the operating device, the land folded part 9 is folded along the operation receiving part for a side surface 12 of the frame 11 to be stacked with the contact terminal folded part 6, whereby the land part for a side surface 9a and the contact terminal for a side surface 6a are disposed in the state of being stacked in the depression direction of the side key 4. At this time, since the land folded part 9 has substantially the same shape as the operation receiving part for a side surface 12, the front end part of the land folded part 9 is formed to have a length so as to prevent the front end part of the land folded part 9 from protruding from the front end part of the operation receiving part for a side surface 12.

The main body part of the flexible wiring member 8 which is substantially parallel to the frame 11 includes an adhesive on the frame 11 surface side, and it is directly applied to the frame 11. Meanwhile, since the land folded part 9 does not include an adhesive on the frame 11 surface side, the land folded part 9 is supported by the operation receiving part for a side surface 12, but not fixed and adhered to the operation receiving part for a side surface 12.

[ASSEMBLY PROCEDURE] Next, the assembly procedure of the operating device of the mobile phone including the above configuration is described with reference to FIGS. 2 to 5. The procedure that the contact terminal sheet 5 and the flexible wiring member 8 are incorporated in the frame 11 is first described.

As shown in FIG. 2, with the use of the positioning tool including pins of the same number as positioning through holes 13 provided in the frame 11, in order of the flexible wiring member 8 and the contact terminal sheet 5, the pins of the positioning tool are inserted through positioning through holes 7 and 10 as with the frame 11 in such a state that the respective folded parts 9 and 6 are opened, whereby the flexible wiring member 8 and the contact terminal sheet 5 are dropped in a key button surface on the front side. Thereby, the frame 11, the flexible wiring member 8, and the contact terminal sheet 5 are sequentially applied in this order with the adhesive provided in the flexible wiring member 8 and the contact terminal sheet 5 to be integrally stacked (stacking process). FIG. 2 is a view of each of the composing elements 5, 8, and 11 as viewed from the rear surface. FIG. 3(a) shows a state in which these elements are applied and stacked. At this time, the contact terminal folded part 6 in which the contact terminal for a side surface 6a of the contact terminal sheet 5 is mounted is positioned to oppose the land folded part 9 in which the land part for a side surface 9a of the flexible wiring member 8 is mounted.

As shown in FIG. 3(a), the land folded part 9 and the contact terminal folded part 6 are in the state of protruding and being opened for the operation receiving part for a side surface 12 of the frame 11 which is folded beforehand (see, the chain double-dashed line in FIG. 4), and thus, as shown in FIG. 3(b), the land folded part 9 and the contact terminal folded part 6 are folded along the operation receiving part for a side surface 12 at substantially a right angle (folding process). Namely, the land folded part 9 and contact terminal folded part 6 are folded on lines 16 and 17 shown in FIGS. 2 and 3. Thus, the land folded part 9 and the contact terminal folded part 6 are in the state of being stacked onto the operation receiving part for a side surface 12.

Subsequently, as shown in FIGS. 3(c), 4, and 5, the extension part 60 of the contact terminal sheet 5 protruding from the front end part of the operation receiving part for a side surface 12 is folded to inner side (extension part folding process). FIG. 5 is a view as viewed from the diagonal side. At this time, the extension part 60 is folded at the narrow part 61 which is shown as a line 18 of FIGS. 2 and 3 and positioned at the root part of the extension part 60. The narrow part 61 is positioned so as to be fitted in the recessed part 19 formed in the front end part of the operation receiving part for a side surface 12, whereby the positioning in the left and right directions and the device thickness direction is performed.

The narrow part 61 is folded at about 360 degrees to cover the front end part of the operation receiving part for a side surface 12, whereby the extension part 60 of the contact terminal sheet 5 is in contact with the rear surface side of the operation receiving part for a side surface 12. Here, since the adhesive is provided in the extension part 60, the extension part 60 can be applied to the rear surface side of the operation receiving part for a side surface 12 (extension part application process), whereby the position of the contact terminal folded part 6 of the contact terminal sheet 5, that is, the position of the contact terminal for a side surface 6a can be fixed.

However, in the above state, the land folded part 9 of the flexible wiring member 8 is not fixed and adhered to the operation receiving part for a side surface 12, and, in addition, the stacked contact terminal folded part 6 of the contact terminal sheet 5 is not fixed and adhered to the land folded part 9. Therefore, each position of the land folded part 9 and the contact terminal folded part 6 can be flexibly fine adjusted on the operation receiving part for a side surface 12.

Next, the frame 11, in which the contact terminal sheet 5 and the flexible wiring member 8 are stacked, is engaged to a substrate 14. At this time, the frame 11 is engaged by a claw structure (not shown) provided in the frame 11 or other means. The flexible wiring member 8 and the substrate 14 are connected to each other using a connection part such as a connector and a method, whereby a structure in which a signal showing the depression of the key button 3 is transmitted from a land part provided in the flexible wiring member 8 to the substrate 14 through a wire to cause the control of the device, is provided.

Thereafter, the frame 11 and the substrate 14 are accommodated between the front case 1 and the rear cover 15 in such a state that various buttons including the side key 4 of the key top 3 are protruded through the side key hole 2 or other holes of the front case 1 to combine the front case 1 and the rear cover 15 by a claw fitting, for example.

Thereby, since each part of the contact terminal sheet, the flexible cable, and the frame, which are stacked to form a normal operating part structure, is folded along the side surface, the structure for mounting a side key in the present invention can be realized by a simple constitution, and, at the same time, the constitutions of various buttons such as the numeric keypad positioned on the front side and the side key can be integrated. Thus, it is possible to realize the reduction of the thickness of the terminal, the acceleration of the manufacturing speed, and the reduction of the manufacturing cost.

In addition, the extension part 60 of the contact terminal folded part 6 is folded at the front end part of the operation receiving part for a side surface 12, and specifically, the constitution in which the extension part 60 is fitted in the recessed part 19 formed in the front end part is adopted, whereby the positioning in the device thickness direction and the left and right directions (longitudinal direction of the device) can be easily performed.

Further, after the fixation of the contact terminal folded part 6, since the fine positioning of the contact terminal for a side surface 6a and the land part for a side surface 9a corresponding to the side key 4 can be realized, the device with a high accuracy can be obtained.

In the above exemplary embodiment, the constitution including the side key, which is depressed substantially perpendicular to the side surface of the operating device of the mobile phone, has been described; however, the depression angle of the side key is not limited. Specifically, a disposition angle or the like of the operation receiving part for a side surface 12 and the folded parts 6 and 9 is changed in accordance with the pressing angle of the side key and the angle of the side surface with the side key provided thereon so as to can correspond to various side keys. In addition, a plurality of constitutions of the operation receiving part for a side surface 12, the contact terminal folded part 6, and the land folded part 9 are provided, whereby the side key can be mounted on a plurality of side surfaces without increasing the size of the device.

INDUSTRIAL APPLICABILITY

The present invention can be utilized in an information processing terminal such as a mobile phone including a side key, and has an industrial applicability.

DESCRIPTION OF REFERENCE NUMERAL

Figure 1:
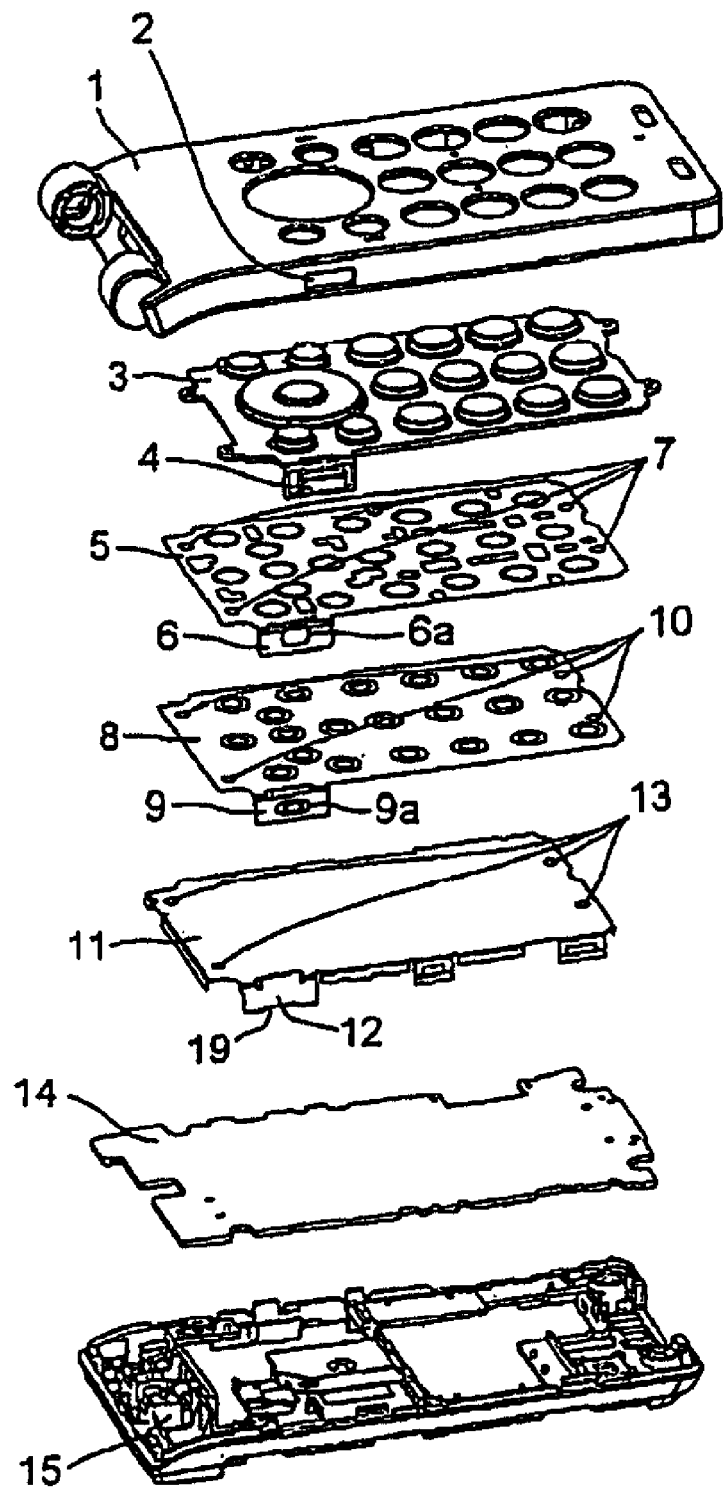
FIG. 1 is an exploded view showing a constitution of an operating device of a mobile phone.
Figure 2:
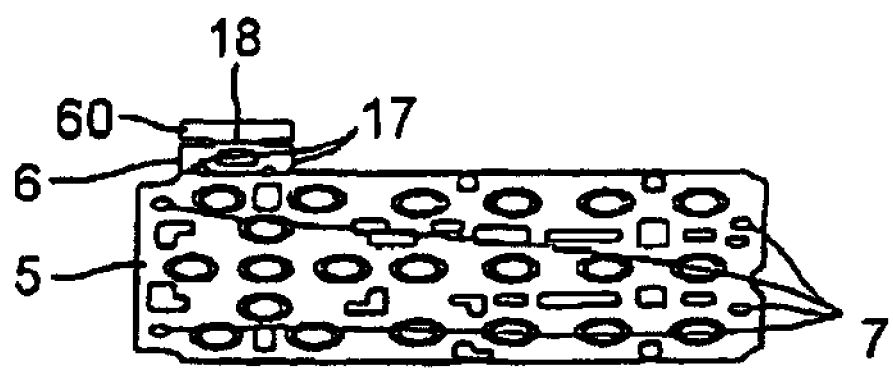
FIG. 2 is an exploded view showing a part of the constitution of the operating device of the mobile phone and showing a state before assembly.
Figure 2:
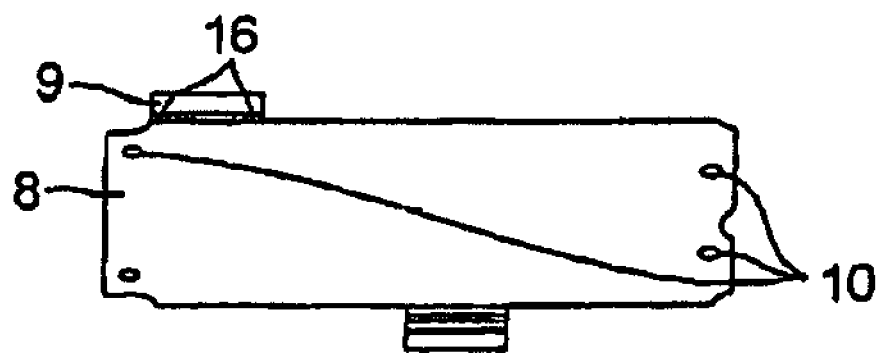
Figure 2:
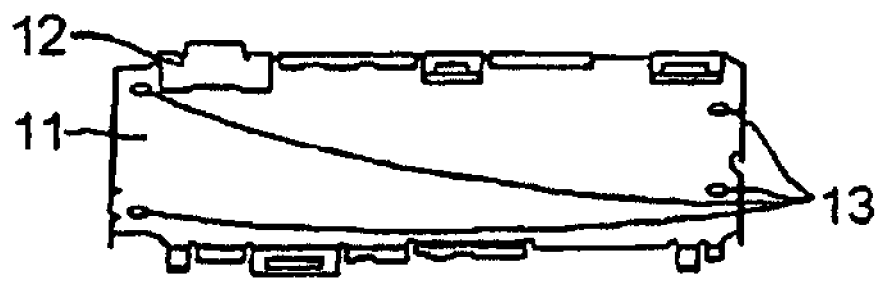
Figure 3:
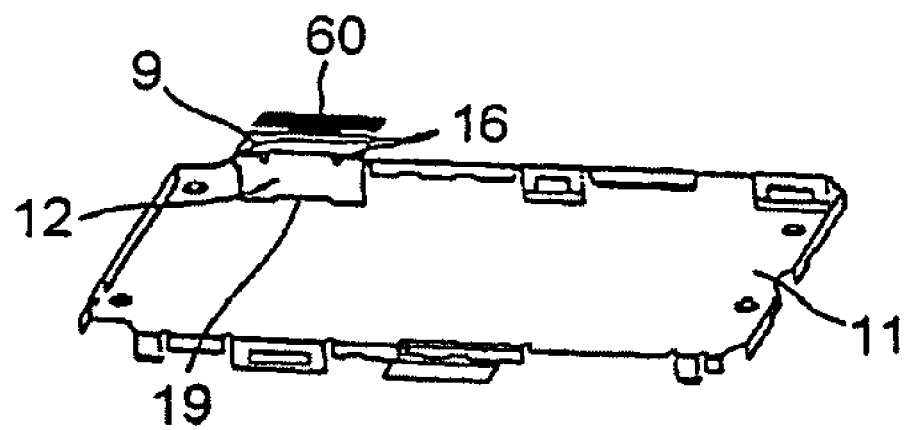
FIG. 3 is a view showing a state in the assembly of a part of the constitution of the operating device of the mobile phone.
Figure 3:
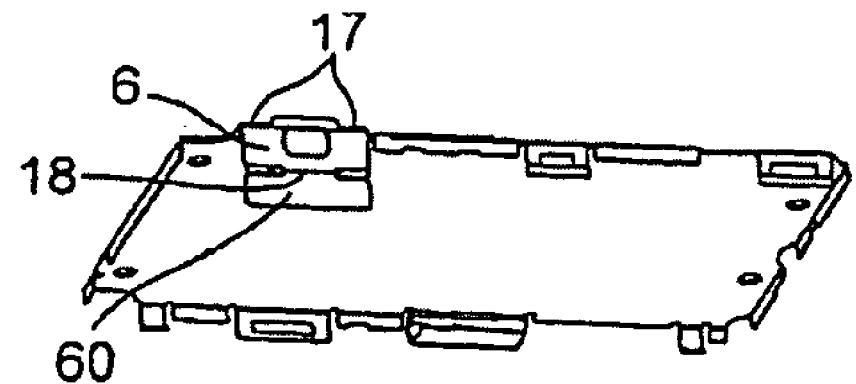
Figure 3:
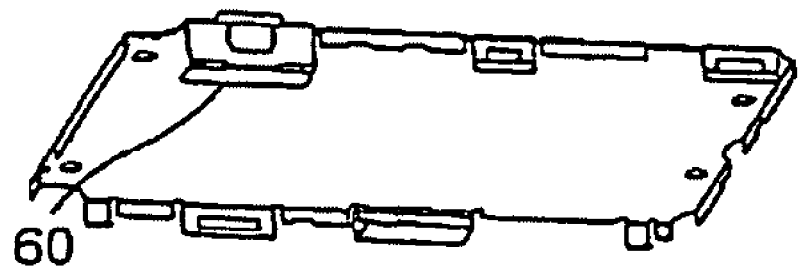
Figure 4:
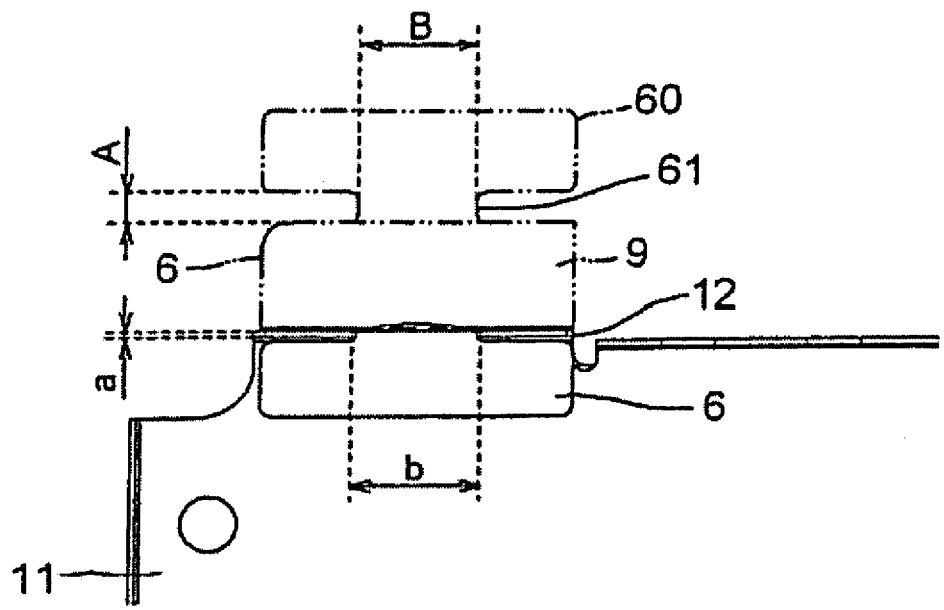
FIG. 4 is a view showing a state in the assembly of a part of the constitution of the operating device of the mobile phone.
Figure 5:
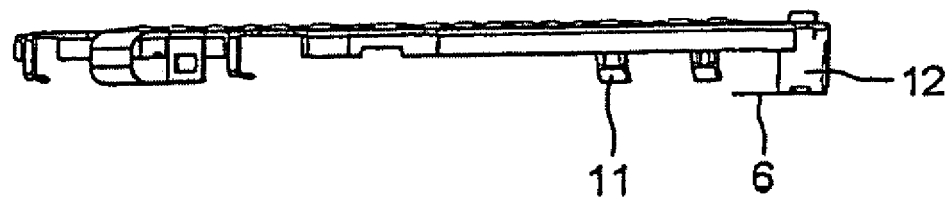
FIG. 5 is a view showing a state in the assembly of a part of the constitution of the operating device of the mobile phone.

1 Front case
2 Side key hole
3 Key top
4 Side key
5 Contact terminal sheet
6 Contact terminal folded part
8 Flexible wiring member
9 Land folded part
11 Frame
12 Operation receiving part for a side surface
14 Substrate
15 Rear cover
19 Recessed part
60 Extension part
61 Narrow part
6a Contact terminal for a side surface
9a Land part for a side surface

The invention claimed is:

1. An operating device, which includes:
   a stacked structure of a contact terminal sheet including a plurality of contact terminals, a flexible wiring member including a land folded part and a plurality of land parts and wire parts, and a plate-like frame supporting the contact terminal sheet and the flexible wiring member; and
   an extension part, which is folded at a front end part of the operation receiving part for a side surface to cover the front end part, is provided in the contact terminal folded part, wherein:
   the plate-like frame is folded to form an operation receiving part for a side surface disposed in a side surface of the device;
   the contact terminal sheet comprises a contact terminal folded part, which is folded along and supported by the operation receiving part for a side surface, wherein the contact terminal folded part includes a contact terminal for a side surface, which corresponds to: (a) a side surface operation part, and (b) the land folded part, which includes a land part connected to the contact terminal for a side surface.

2. The operating device according to claim 1, wherein the land folded part is formed to have a length so as to prevent the land folded part from protruding from the front end part of the operation receiving part for a side surface in such a state that the land folded part is supported by the operation receiving part for a side surface.

3. The operating device according to claim 2, wherein the land folded part supported by the operation receiving part for a side surface is not fixed and adhered to the operation receiving part for a side surface.

4. The operating device according to claim 1, wherein the contact terminal folded part, which is supported by the operation receiving part for a side surface and stacked on the land folded part, is not fixed and adhered to the land folded part.

5. The operating device according to claim 4, wherein the extension part provided in the contact terminal folded part is applied to the inside of the operation receiving part for a side surface.

6. The operating device according to claim 5, wherein a recessed part is formed in a front end part of the operation receiving part for a side surface, and a narrow part fitted in the recessed part is provided in a folding position of the extension part in the front end part of the operation receiving part for a side surface.

7. The operating device according to claim 6, wherein a length in the folding direction of the narrow part is set to be substantially equal to the plate thickness of the front end part of the operation receiving part for a side surface.

8. An information processing terminal, being characterized in that the terminal includes the operating device according to claim 7.

9. The information processing terminal according to claim 8, being characterized in that the terminal is a portable information processing terminal.

10. The information processing terminal according to claim 9, being characterized in that the terminal is a mobile phone.

11. An assembly method for an operating device, comprising:
- a stacking process of stacking a contact terminal sheet including a plurality of contact terminals, a flexible wiring member including a plurality of land parts and wire parts, and a plate-like frame supporting the contact terminal sheet and the flexible wiring member;
- a folding process of folding a contact terminal folded part, which is provided in the contact terminal sheet and includes a contact terminal for a side surface, corresponding to a side surface operation part disposed in a side surface of the device, and a land folded part, which is provided in the flexible wiring member and includes the land part connected to the contact terminal for a side surface, so that the contact terminal folded part and the land folded part are supported by a receiving part for a side surface formed by folding the frame which receives a pressing operation to the side surface operation part; and
- an extension part folding process for, after the folding process, folding an extension part, provided on a front end side of the contact terminal folded part, at a front end part of the operation receiving part for a side surface so that the extension part covers the front end part.

12. The assembly method for the operating device according to claim 11, wherein, in the folding process, the land folded part is not fixed and adhered to the operation receiving part for a side surface.

13. The assembly method for the operating device according to claim 12, wherein, in the stacking process and the folding process, the contact terminal folded part stacked on the land folded part is not fixed and adhered to the land folded part.

14. The assembly method for the operating device according to claim 13, further comprising:
- an extension part application process for, after the extension part folding process, applying the extension part to an inside of the operation receiving part for a side surface.

15. The assembly method for the operating device according to claim 14, wherein, in the extension part folding process, a narrow part, which is formed at a folding position of the extension part in the front end part of the operation receiving part for a side surface, is fitted in a recessed part formed in the front end part of the operation receiving part for a side surface.

16. An assembly method for an information processing apparatus, being characterized in that an information processing apparatus including the operating device is assembled using the assembly method for the operating device according to claim 15.

* * * * *